(12) United States Patent
Maeshima et al.

(10) Patent No.: US 11,898,750 B2
(45) Date of Patent: Feb. 13, 2024

(54) CONTROL METHOD FOR A CATALYTIC COMBUSTION APPARATUS AND A CATALYTIC COMBUSTION SYSTEM

(71) Applicant: NISSAN MOTOR CO., LTD., Yokohama (JP)

(72) Inventors: Susumu Maeshima, Kanagawa (JP); Tadaki Mano, Kanagawa (JP); Hiroyuki Wada, Kanagawa (JP); Masamitsu Satake, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 514 days.

(21) Appl. No.: 17/059,652

(22) PCT Filed: Jun. 1, 2018

(86) PCT No.: PCT/JP2018/021265
§ 371 (c)(1),
(2) Date: Nov. 30, 2020

(87) PCT Pub. No.: WO2019/229994
PCT Pub. Date: Dec. 5, 2019

(65) Prior Publication Data
US 2021/0262662 A1 Aug. 26, 2021

(51) Int. Cl.
| | | |
|---|---|---|
| *F23N 1/02* | (2006.01) | |
| *F23C 13/00* | (2006.01) | |
| *F23D 5/12* | (2006.01) | |
| *F23D 5/18* | (2006.01) | |
| *F23K 5/10* | (2006.01) | |
| *H01M 8/04014* | (2016.01) | |
| *H01M 8/04701* | (2016.01) | |

(52) U.S. Cl.
CPC .............. *F23N 1/022* (2013.01); *F23C 13/00* (2013.01); *F23D 5/126* (2013.01); *F23D 5/18* (2013.01); *F23K 5/10* (2013.01); *F23C 2700/02* (2013.01); *F23C 2900/13001* (2013.01); *F23K 2300/103* (2020.05); *F23N 2237/12* (2020.01); *H01M 8/04022* (2013.01); *H01M 8/04708* (2013.01); *H01M 2250/20* (2013.01)

(58) Field of Classification Search
None
See application file for complete search history.

(56) References Cited

U.S. PATENT DOCUMENTS

2002/0182465 A1* 12/2002 Okamoto .......... H01M 8/04022
429/425

FOREIGN PATENT DOCUMENTS

EP          0 716 263 A2    6/1996
JP       2000191304 A  *   7/2000  .............. B01B 1/005
(Continued)

*Primary Examiner* — Jason Lau
(74) *Attorney, Agent, or Firm* — Foley & Lardner LLP

(57) ABSTRACT

A method for controlling a catalytic combustion apparatus having a heater capable of heating fuel to be supplied to a catalyst includes a step of supplying oxidant gas to the catalytic combustion apparatus, and an injection step of injecting the fuel into the catalytic combustion apparatus. The injection step also includes an electric power feeding step of supplying electric power to the heater, and a setting step of setting an injection amount of the fuel to be injected into the catalytic combustion apparatus in response to output of the heater.

6 Claims, 5 Drawing Sheets

(56) References Cited

FOREIGN PATENT DOCUMENTS

| | | | | |
|---|---|---|---|---|
| JP | 2001-021112 A | | 1/2001 | |
| JP | 2009162162 A | * | 7/2009 | ........... B01D 53/944 |
| JP | 2013-253004 A | | 12/2013 | |

* cited by examiner

CONTROL METHOD FOR A CATALYTIC COMBUSTION APPARATUS AND A CATALYTIC COMBUSTION SYSTEM

TECHNICAL FIELD

The present invention relates to a method for controlling a catalytic combustion apparatus having a heater and a catalytic combustion system.

BACKGROUND OF THE INVENTION

JP2013-253004A discloses a technique regarding a reformer in which after a heater is electrically energized, the energization of the heater is released if each of temperature of an oxidizing region and a reforming region of a catalytic converter becomes equal to or higher than a predetermined temperature, and then hydrogen-based fuel is supplied.

SUMMARY OF THE INVENTION

The above-described technique can be applied to a catalytic combustor. There, however, is a problem that the fuel is injected after the temperature of the catalyst being fully raised and thereby results in elongating a required time to activate the apparatus.

The present invention has been made in view of the problem and an object of the present invention is to provide a control method and a catalytic combustion system for activating a catalytic combustion apparatus at an early stage.

According to one aspect of the present invention, a method for controlling a catalytic combustion apparatus having a heater capable of heating fuel to be supplied to a catalyst includes a step of supplying oxidant gas to the catalytic combustion apparatus, and an injection step of injecting the fuel into the catalytic combustion apparatus. The injection step then includes an electric power feeding step of supplying electric power to the heater, and a setting step of setting an injection amount of the fuel to be injected into the catalytic combustion apparatus in response to output of the heater.

DESCRIPTION OF EMBODIMENTS

Embodiments of the present invention will be described below with reference to the accompanying drawings.

First Embodiment

Figure 1:
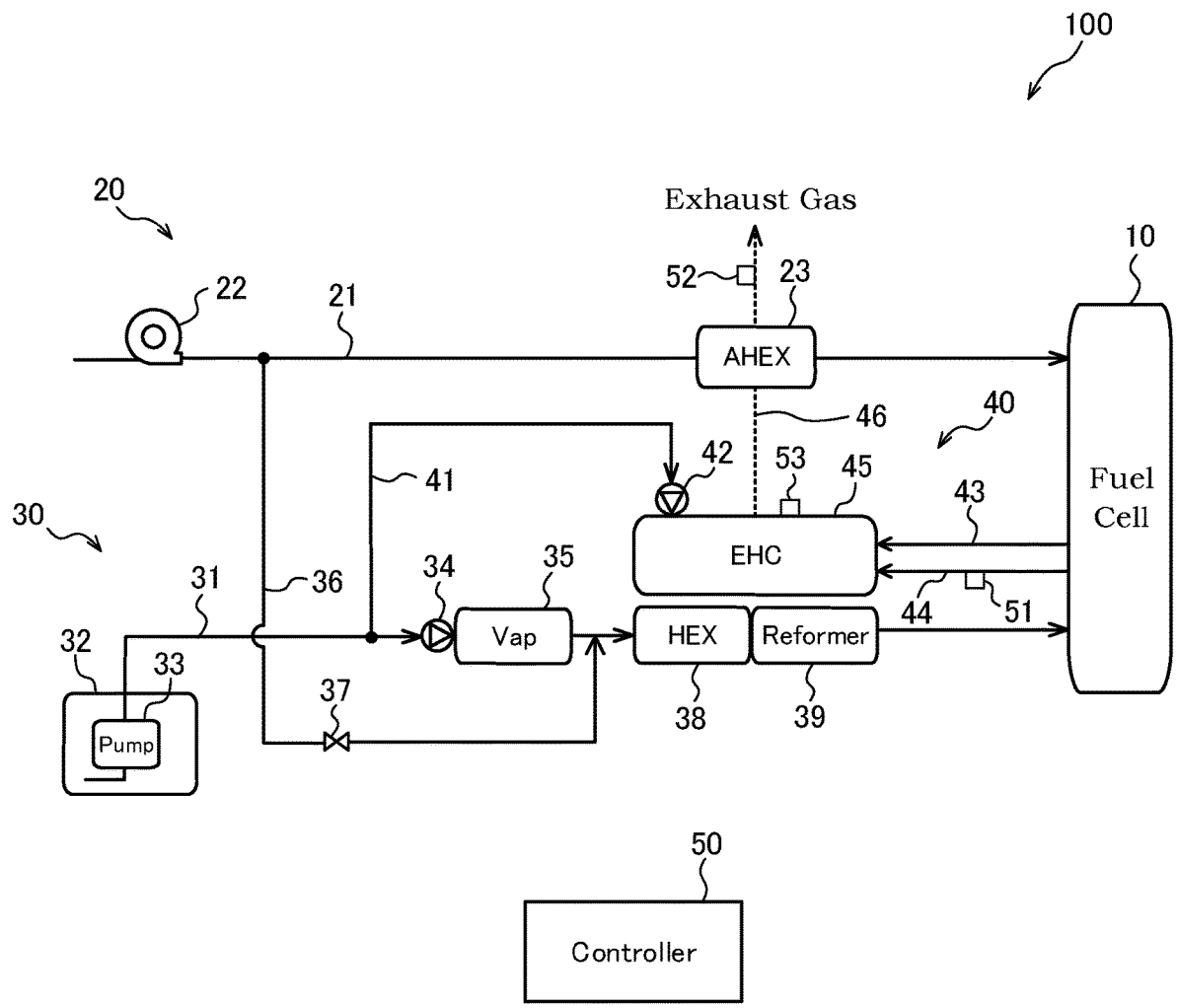
FIG. 1 is a diagram for showing a configuration example of a fuel cell system according to a first embodiment of the present invention.

FIG. 1 is a configuration diagram showing an example of a configuration of a fuel cell system 100 according to an embodiment of the present invention.

The fuel cell system 100 allows a fuel cell 10 to generate electric power by supplying fuel gas and oxidant gas to the fuel cell 10. The fuel cell system 100 is mounted on a mobile body such as a vehicle, an airplane, or a ship. According to this present embodiment, the fuel cell system 100 is mounted on a vehicle such as a hybrid vehicle or an electric vehicle.

The fuel cell system 100 includes the fuel cell 10, an oxidant supply device 20, a fuel supply device 30, a heating device 40, and a controller 50.

The fuel cell 10 generates electric power, being supplied with fuel gas and the oxidant gas. The fuel cell 10 is realized by a fuel cell such as a solid oxide type or a solid polymer type. The fuel cell 10 of the present embodiment is laminated cells in which a plurality of a single solid oxide type fuel cell is stacked. For example, the fuel cell 10 generates electric power by a chemical reaction between the fuel gas and the oxidant gas under a temperature of the fuel cell 10 arriving at a range of 600° C. to 700° C.

The oxidant supply device 20 supplies the oxidant gas to the fuel cell 10, the oxidant gas required for electric power generation of the fuel cell 10. The oxidant supply device 20 includes an oxidant supply passage 21, a compressor 22, and an oxidant heat exchanger 23.

The oxidant supply passage 21 is a passage for supplying the oxidant gas to the fuel cell 10. In the present embodiment, one end of the oxidant supply passage 21 communicates with the outside air, and the other end thereof is connected to an oxidant inlet hole of the fuel cell 10.

The compressor 22 is an actuator provided in the oxidant supply passage 21. The compressor 22 sucks the air as the oxidant gas from the one end of the oxidant supply passage 21. The compressor 22 compresses the air and then supplies the air to the fuel cell 10 through the oxidant supply passage 21. The compressor 22 is used as the actuator in the present embodiment. Instead of the compressor 22, a blower or the like may be used.

The oxidant heat exchanger 23 is a heat exchanger that heats the oxidant gas to be supplied to the fuel cell 10, the heating of the oxidant gas is for warming up the fuel cell 10. In the present embodiment, the oxidant heat exchanger 23 performs heat exchange between the high-temperature exhaust gas generated by the heating device 40 and the air from the compressor 22. The oxidant heat exchanger 23 outputs the air to the fuel cell 10, the air having been heated by the heat exchange.

The fuel supply device 30 supplies the fuel gas to the fuel cell 10, the fuel gas required for electric power generation of the fuel cell 10. The fuel supply device 30 includes a fuel supply passage 31, a raw fuel tank 32, a fuel pump 33, an injector 34, an evaporator 35, a heater 36, and a reformer 37.

The fuel supply passage 31 is a passage for supplying the fuel gas to the fuel cell 10. In the present embodiment, one end of the fuel supply passage 31 is connected to the raw fuel tank 32, the other end thereof is connected to a fuel inlet hole of the fuel cell 10.

The raw fuel tank 32 stores raw fuel required for production of the fuel gas. As the raw fuel, an aqueous solution, which contains an oxygen-containing fuel and water, is employed. The oxygen-containing fuel is the raw fuel which contains an oxygen-containing compound such as alcohol or methyl tertiary butyl ether (MTBE). An ethanol aqueous solution is employed as the raw fuel of the present embodiment. The ethanol aqueous solution contains an approximately 40% vol of ethanol.

The fuel pump 33 supplies the raw fuel to the injector 34, the raw fuel stored in the raw fuel tank 32. In the present embodiment, the fuel pump 33 is provided inside the raw fuel tank 32. Alternatively, the fuel pump 33 may be disposed between the raw fuel tank 32 and the injector 34.

The injector 34 is an injector for injecting the raw fuel. The injector 34 injects the raw fuel supplied by the fuel pump 33 into the evaporator 25 at predetermined cycles.

The evaporator 35 vaporizes the raw fuel injected by the injector 34 and results in generating mixed gas of water vapor and oxygenated fuel gas. The evaporator 35 is heated, for example, by utilizing of the exhaust gas of the heating device 40.

The heater 38 is a heat exchanger for raising the temperature of the mixed gas from the evaporator 35 up to a predetermined temperature required for reforming the mixed gas. The heater 26 of the present embodiment heats the mixed gas from the evaporator 25 by utilizing of the exhaust gas from the heating device 40.

The reformer 39 reforms the mixed gas from the heater 36 and results in generating the fuel gas. The reformer 39 then outputs the generated fuel gas to the fuel cell 10.

The heating device 40 heats the fuel cell 10, the oxidant heat exchanger 23, the evaporator 35, the heater 38, and the reformer 39. Oxidant gas and fuel gas to the fuel cell 10 are thus heated. The raw fuel, which is injected from the injector 34 to the reformer 39, is also heated.

The heating device 40 includes a raw fuel passage 41, an injector 42, a fuel cell exhaust passage 43, a fuel cell exhaust passage 44, a catalytic combustion apparatus 45, and an exhaust passage 46.

The raw fuel passage 41 is a passage for supplying the raw fuel to the catalytic combustion apparatus 45. According to the present embodiment, one end of the raw fuel passage 41 is connected to a passage branching from the fuel supply passage 31 at upstream of the injector 34. The other end of the raw fuel passage 41 is connected to the injector 42.

The injector 42 has the same configuration as the injector 34 and also injects the raw fuel into the catalytic combustion apparatus 45, the raw fuel being supplied by the fuel pump 33.

The fuel cell exhaust passages 43 and 44 are passages for respectively passing the oxidant gas and the fuel gas to the catalytic combustion apparatus 45, the oxidant gas and the fuel gas discharged from the fuel cell 10. In the present embodiment, and one end of the fuel cell exhaust passage 43 is connected to an oxidant discharge hole of the fuel cell 10, and the other end thereof is connected to the catalytic combustion apparatus 45. One end of the fuel cell exhaust passage 44 is connected to a fuel discharge hole of the fuel cell 10, and the other end thereof is connected to the combustor 45.

The catalytic combustion apparatus 45 serves as an exhaust combustor for combusting the mixed gas of the oxidant gas and the fuel gas discharged from the fuel cell 10. The catalytic combustion apparatus 45 also serves as a start-up combustor for combusting the raw fuel injected from the injector 42 in order to allow the fuel cell system 100 to start. The catalytic combustion apparatus 45 outputs combustion gas to the exhaust passage 46 as exhaust gas, the combustion gas obtained by combusting fuel gas from the fuel cell 10 and the raw fuel from the injector 42.

The exhaust passage 46 is a passage for discharging the exhaust gas from the catalytic combustion apparatus 45 to outside of the fuel cell system 100. The exhaust passage 46 communicates with the outside, with having gone through from the catalytic combustion apparatus 45 to the oxidant heat exchanger 23. The exhaust passage 46 may branch from the middle of the path from the catalytic combustion apparatus 45 to the oxidant heat exchanger 23 and communicate with the outside through the reformer 37, the heater 36, and the evaporator 35 in this order.

The controller 50 is a controller for controlling an operation of the fuel cell system 100, and executing preprogrammed processing. The controller 50 is configured by one or more microcomputers, which include a central processing unit (CPU) and a storage device.

Detection values of various sensors such as temperature sensors 51-53 are input to the controller 50. For example, the temperature sensor 51 is disposed in the fuel cell exhaust passage 44 to detect a temperature of an anode pole of the fuel cell 10. The temperature sensor 52 is disposed in the exhaust passage 46 to detect a temperature of the exhaust gas.

The temperature sensor 53 detects a temperature of the catalytic combustion apparatus 45. Since detection values of the temperature sensors 51 and 52 correlate with the temperature of the catalytic combustion apparatus 45, at least one of the detection values of the temperature sensors 51 and 52 may be used as the temperature of the catalytic combustion apparatus 45 instead of the detection value of the temperature sensor 53.

The controller 50 stores a program for executing a predetermined process. When the controller 50 receives a start-up operation by the user for the fuel cell system 100, an electric power request from a load of the fuel cell 10, or the like, the controller 50 executes a start-up process of the fuel cell system 100, the start-up process executed in order to allow the fuel cell 10 to become a state capable of generating electric power.

Specifically, the controller 50 operates the compressor 22 and the injector 42 to activate the catalytic combustion apparatus 45. The oxidant gas from the compressor 22 is thus supplied to the catalytic combustion apparatus 45 via the fuel cell 10, and the raw fuel is also injected from the injector 42 to the catalytic combustion apparatus 45. As a result, the raw fuel gas is combusted in the catalytic combustion apparatus 45.

Since the catalytic combustion apparatus 45 per se generates heat due to the combustion of the raw fuel gas, the heater 36 and the reformer 37 are heated. The oxidant heat exchanger 23, the evaporator 35, the heater 36, the reformer 37, and the like are also heated by the exhaust gas from the catalytic combustion apparatus 45. A startup process of the fuel cell system 100 completes when the temperature of the fuel cell 10 rises up to a temperature, which allows the fuel cell 10 to generate electric power.

Upon the completion of the startup process of the fuel cell system 100, the controller 50 controls the operation of the compressor 22 and the injector 34 so that each of supply flow rates of the fuel gas and the oxidant gas to the fuel cell 10 becomes a predetermined target value. For example, the predetermined target value is set according to a magnitude of the load of the fuel cell 10.

Figure 2:
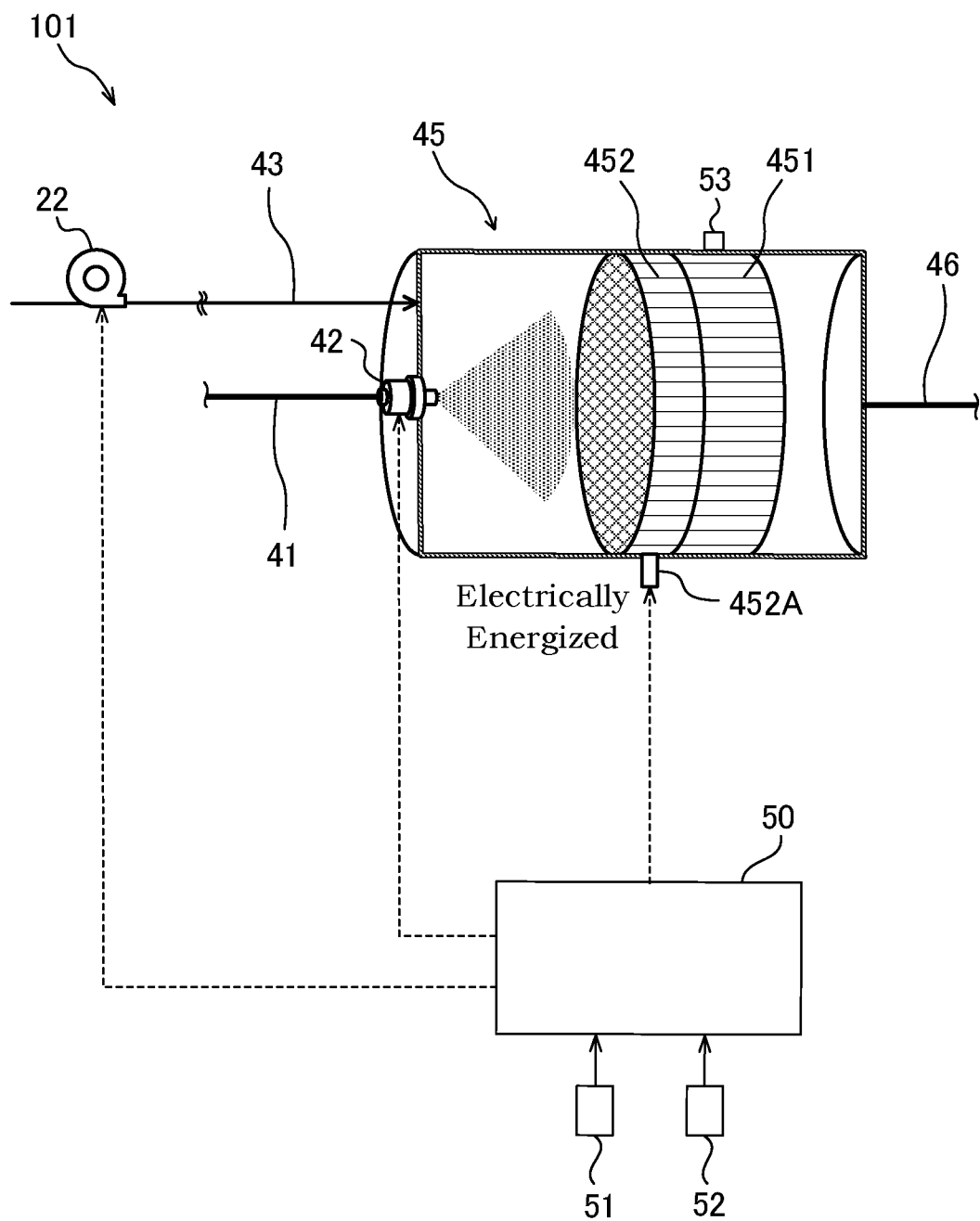
FIG. 2 is a diagram for showing a configuration example of a catalytic combustion apparatus provided in the fuel cell system.

FIG. 2 is a diagram showing a basic configuration of a catalytic combustion system 101 for starting the catalytic combustion apparatus 45 according to the present embodiment. The catalytic combustion system 101 is a part of the fuel cell system 100.

The catalytic combustion apparatus 45 includes a catalyst 451 for burning the raw fuel and a heater 452 for heating the raw fuel to be supplied to the catalyst 451.

The catalyst 451 is a combustion catalyst which burns the raw fuel gas which has been vaporized by using the oxidant gas. The catalyst 451 and the heater 452 are arranged side by side so that an upstream end face of the catalyst 451 and a downstream end face of the heater 452 are in contact with each other. The catalyst 451 is a member in which a catalyst material is supported on a surface of a honeycomb structure, the honeycomb structure serving as a support body. The honeycomb structure is formed as a cylindrical member made of metal. Platinum (Pt), palladium (Pd), or the like can be employed as the catalyst material, which is supported on the honeycomb structure.

The heater 452 is an electric heater that vaporizes the raw fuel injected into the catalyst 451, and is used, for example in a situation where the temperature of the catalyst 451 is lower than the temperature at which the raw fuel can be combusted. Therefore, the heater 452 is not used in a self-sustaining operation state in which a main body temperature of a main body of the catalytic combustion apparatus 45 is sufficiently high.

The heater 452 is composed of the honeycomb structure served as a body, and an electrode portion provided on an outer periphery of the honeycomb structure. The honeycomb structure is formed as a cylindrical member made of metal, and is fixed in the catalytic combustion apparatus 45. The electrode portion 452A is provided so as to protrude from inside of the catalytic combustion apparatus 45 toward the outside. The honeycomb structure is heated by electrically energizing the electrode portion 452A.

The controller 50 is configured to supply electric power to the heater 452 by energizing the heater 452 from an electric power source when activating the catalytic combustion apparatus 45, the electric power source such as a battery not shown in drawings.

When electric power is supplied to the heater 452, that is, under the heater 452 heating the catalyst 451, the injection of the injector 42 generally has been stopped until the temperature of the catalyst 451 reaches an operating temperature. The operating temperature is a temperature at which the injection amount of the raw fuel under the self-sustaining operation can be sufficiently combusted. Under such a waiting time being provided, a required time up to the combustion of the raw fuel from a start of the energization of the heater 452, i.e., the time required for starting the catalytic combustion apparatus 45 elongates.

On the other hand, when the raw fuel is injected from the injector 34 to the catalytic combustion apparatus 45 under the catalyst 451 heated by the heater 452, the combustion reaction may not occur because latent heat of vaporization of the raw fuel leads to a drop in the temperature of the catalyst 451. In such a situation, when liquid raw fuel stays at the bottom of the catalytic combustion apparatus 45 and the staying raw fuel comes into contact with the catalyst 451, a concentration of the raw fuel becomes excessively high in the portion. The catalyst 451 thus deteriorates.

The controller 50 of the present embodiment is configured to limit the injection amount of the raw fuel from the injector 34 to the catalytic combustion apparatus 45 in order to activate the catalytic combustion apparatus 45, in response to output of the heater 452 under electric power being supplied to the heater 452.

Figure 3:
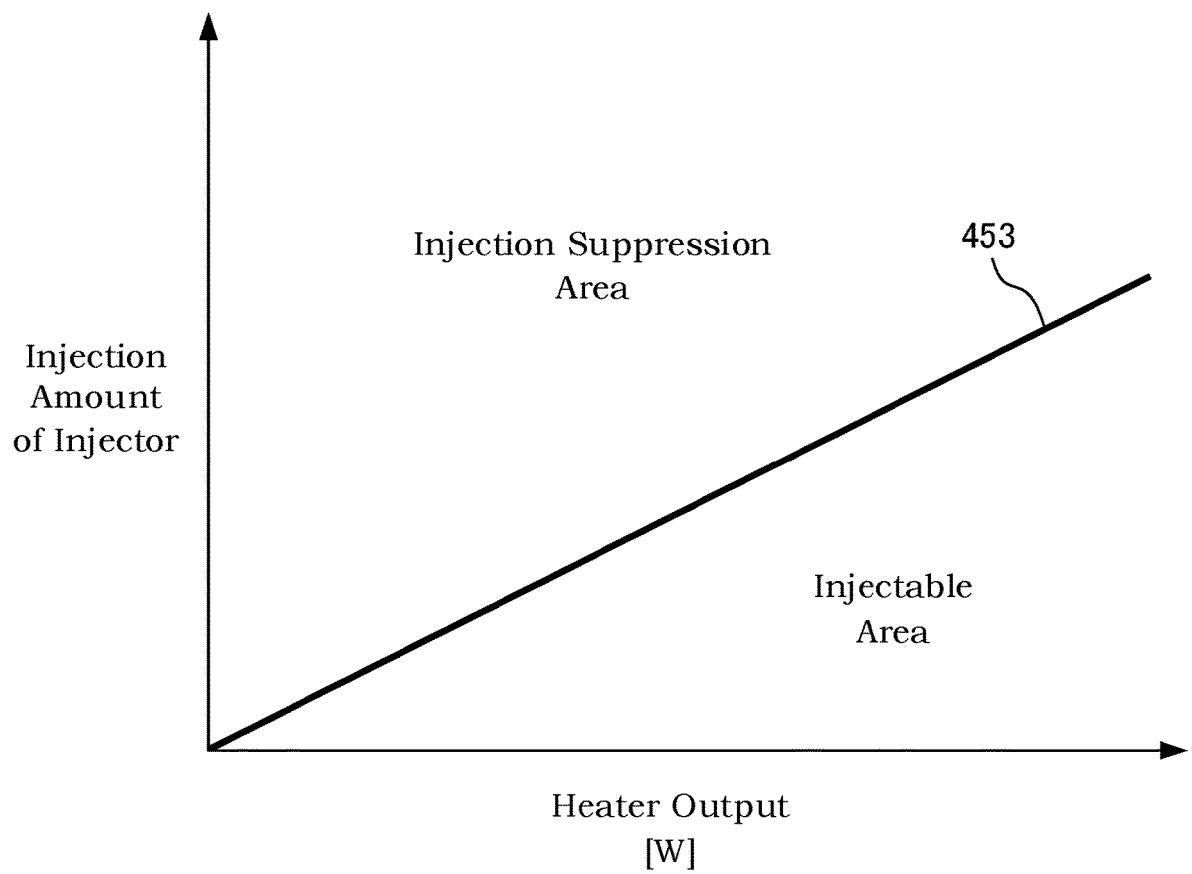
FIG. 3 is a diagram for explaining an area in which an injection amount of an injector is limited in accordance with output of the heater constituting the catalytic combustion apparatus.

FIG. 3 is a diagram for explaining a relationship between the output of the heater 452 and the injection amount of the injector 34.

The output of the heater 452 is a value obtained by converting an amount of heat radiated from the heater 452 into electric power [W], which is approximately equivalent to the electric power supplied to the heater 452.

The injection amount of the injector 42 is adjusted by an injection period [millisecond] of the injector 42. In the present embodiment, the injection amount per one injection by the injector 42 is fixed. Thus, the shorter the injection period [millisecond] is, the more the injection amount from the injector 42 is increased.

An upper limit line 453 is defined so as to avoid a drop in the temperature of the catalyst 451. The upper limit line 453 indicates an upper limit value for the injection amount of the raw fuel which the injector 42 can inject according to the output of the heater 452. The upper limit line 453 is set so that thermal energy, which is the output of the heater 452, exceeds the latent heat of vaporization (energy) of the raw fuel injected from the injector 42.

The controller 50 of the present embodiment is configured to hold a map shown in the relationship shown in FIG. 3. When electric power is supplied to the heater 452, the controller 50 is configured to increase the injection amount of the injector 42 referring to the above map, as the output of the heater 452 becomes larger within the injected amount of the injector 42 not exceeding the upper limit line 453.

In this manner, when electric power is supplied to the heater 452, the controller 50 limits the injection amount of the raw fuel so that the latent heat of vaporization of the raw fuel in the catalytic combustion apparatus 45 becomes equal to or less than the output of the heater 452.

Figure 4:
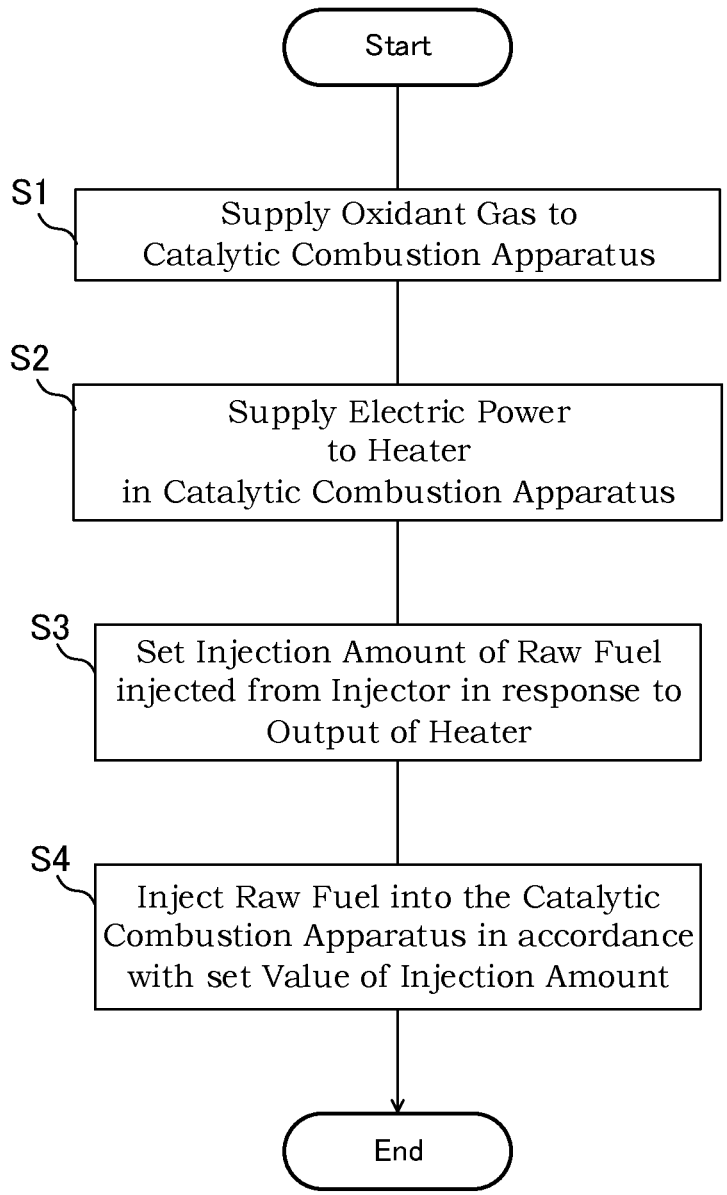
FIG. 4 is a flowchart for showing a control method of a catalytic combustion system in which the catalytic combustion apparatus according to the present embodiment is operated.

FIG. 4 is a flowchart showing an example of processing procedures of the control method for the catalytic combustion apparatus 45 according to the present embodiment. The processing procedures of the control method are repeatedly executed at a predetermined cycle, for example, several hundred millisecond.

In step S1, the controller 50 supplies the oxidant gas to the catalytic combustion apparatus 45 In this embodiment, the controller 50 drives the compressor 22 to activate the catalytic combustion apparatus 45. Thus, the air containing the oxidant gas is supplied to the catalytic combustion apparatus 45 via the fuel cell 10

In step S2, the controller 50 supplies electric power to the heater 452 in the catalytic combustion apparatus 45. In the present embodiment, the controller 50 determines whether or not the detected value of the temperature sensor 53 falls below a predetermined combustion threshold, the detected value of the temperature sensor 53 served as the temperature of the catalyst 451 in the catalytic combustion apparatus 45. When the temperature of the catalyst 451 falls below the combustion threshold, the controller 50 energizes the heater 452 by the electric power supply (not shown).

The above combustion threshold is set based on the temperature at which the raw fuel gas can be combusted in the catalyst 451. The combustion threshold value of the present embodiment is set to a lower limit value of a temperature which allows the combustion reaction of the catalyst 451.

In step S3, the controller 50 sets the injection amount of the raw fuel injected from the injector 34 in response to the output of the heater 452. In the present embodiment, the controller 50 changes the injection period of the injector 34 in response to the detected value of the sensor that for detecting the electric power supplied to the heater 452.

As the sensor for detecting the electric power supplied to the heater 452, at least one of a current sensor for detecting the current supplied to the heater 452 and a voltage sensor for detecting the voltage supplied to the heater 452 is employed.

For example, as shown in FIG. 3, the controller 50 shorten the injection period of the injector 42 as the electric power supplied to the heater 452 increases so that the injection amount of the raw fuel by the injector 42 does not exceed the upper limit line 453. Thus, as the electric power supplied to the heater 452 increases, the injection amount of the injector 34 can be increased within the temperature of the catalyst 451 not being dropped due to the latent heat of vaporization of the raw fuel in the reformer 39.

In step S4, the controller 50 injects the raw fuel into the catalytic combustion apparatus 45 in accordance with the injection amount which is set in step S3. In the present embodiment, the controller 50 injects the raw fuel from the injector 42 into the catalytic combustion apparatus 45 with the injection period corresponding to the electric power supplied to the heater 452.

When the processing of step S4 is completed, a series of the processing procedures of the control method for the catalytic combustion apparatus 45 is completed.

According to the first embodiment of the present invention, as shown in FIG. 2, the catalytic combustion apparatus 45 includes the catalyst 451 for combusting the raw fuel, and the heater 452 capable of heating the raw fuel supplied to the catalyst 451. The catalytic combustion system 101 for operating the catalytic combustion apparatus 45 includes the compressor 22 as an actuator for supplying the oxidant gas to the catalytic combustion apparatus 45, and the injector 42 as an injector for injecting the raw fuel into the catalytic combustion apparatus 45. The catalytic combustion system 101 further includes the controller 50 configured to control the injection amount of the raw fuel to be injected into the catalytic combustion apparatus 45 in response to of the heater 452.

Then, in the control method of the catalytic combustion apparatus 45, as shown in FIG. 4, the controller 50 is configured to execute the process of step S1 of supplying the oxidant gas to the catalytic combustion apparatus 45, and execute the injection step of injecting the raw fuel from the injector 42 to the catalytic combustion apparatus 45. In the injection step, the controller 50 is configured to execute the process of step S2 for supplying electric power to the heater 452, and execute the process of step S3 for setting the injection amount of the injector 42 in response to output of the heater 452.

Thus, when electric power is supplied to the heater 452, for example in a scene that the catalytic combustion apparatus 45 is activated, it is possible to limit the injection amount of the injector 34 in response to output of the heater 452. As a result, it is possible to suppress a drop in the temperature of the catalytic combustion apparatus 45. Therefore, since it is not necessary to wait for the injection of the raw fuel until the temperature of the catalytic combustion apparatus 45 reaches the operating temperature suitable for the combustion reaction in the catalyst 451, it is possible to activate the catalytic combustion apparatus 45 early.

According to the present embodiment, the controller 50 is configured to inject liquid fuel containing water as the raw fuel from the injector 34. In such a scene that the liquid fuel is employed as the raw fuel, the raw fuel is not vaporized and then stays at the bottom in the catalytic combustion apparatus 45 if the latent heat of vaporization of the raw fuel leads to the drop in the temperature of the catalytic combustion apparatus 45. When the staying raw fuel then immerses the catalyst 451, the portion thereof comes to involve an excessively high concentration and thereby becomes deteriorated.

On the other hand, since the controller 50 of the present embodiment is configured to limit the injection amount of the injector 34 in response to output of the heater 452, it is possible to suppress the temperature drop in the catalytic combustion apparatus 45. Therefore, the raw fuel hardly stays in the bottom portion of the catalytic combustion apparatus 45. As a result, when activating the catalytic combustion apparatus 45, it is possible to promptly produce the fuel gas at the catalyst 451 as well as suppress deterioration of the catalyst 451.

Second Embodiment

Next, operation of the catalytic combustion apparatus 45 applied to the fuel cell system 100 as the second embodiment of the present invention will be described.

Figure 5:
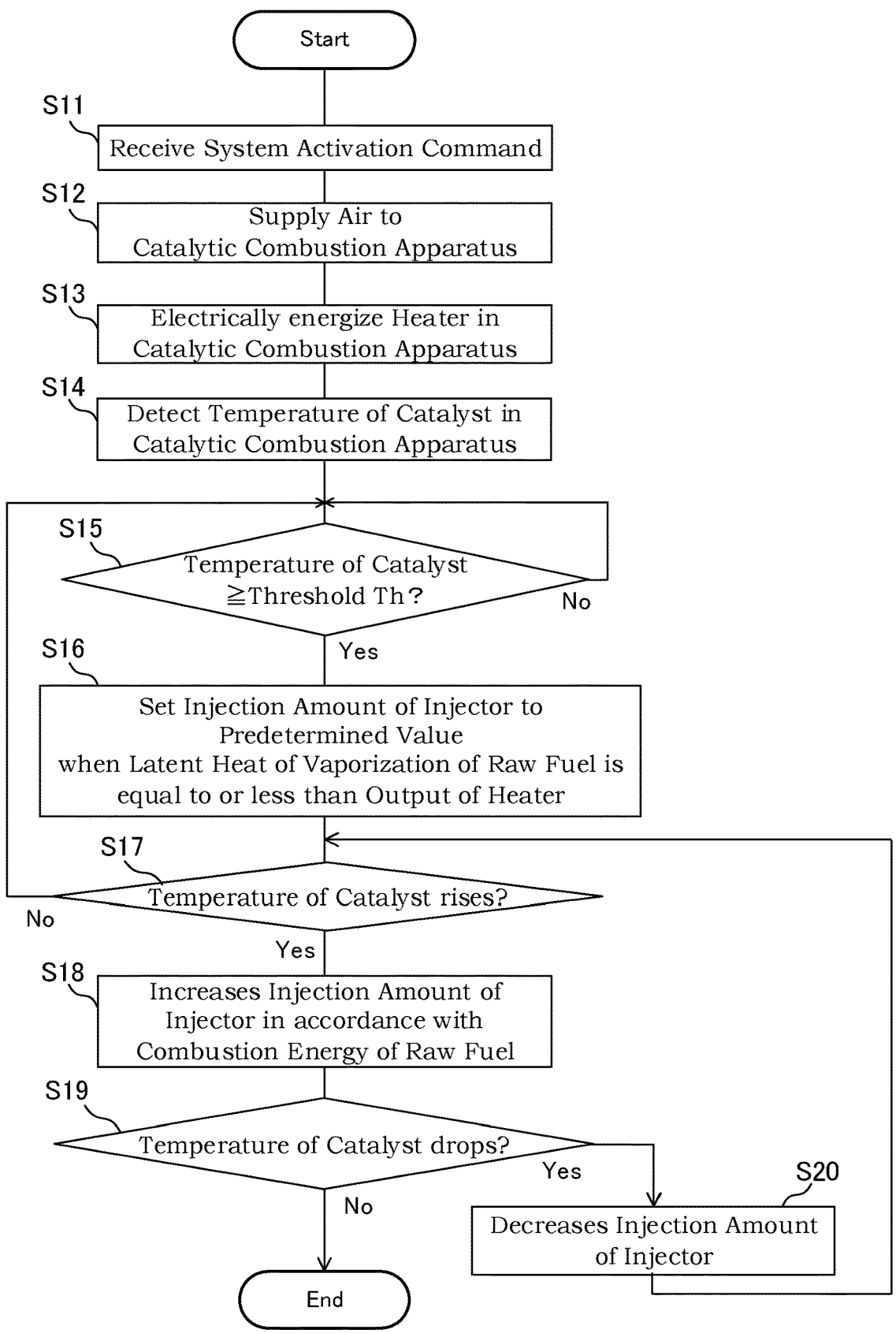
FIG. 5 is a flowchart for showing a control method of the fuel cell system to which the catalytic combustion system is applied.

FIG. 5 is a flowchart illustrating an example of processing procedures of a method for starting-up the fuel cell system 100 in the present embodiment. The processing procedures of the control method are repeatedly executed at a predetermined cycle, for example, several hundred millisecond.

In step S11, the controller 50 receives an start-up command of the fuel cell system 100. The start-up command of the fuel cell system 100 is issued in response to such as a user's button operation or an electric power requirement from the load of the fuel cell 10.

In step S12, the controller 50 supplies the air to the catalytic combustion apparatus 45 via the fuel cell 10 by driving the compressor 22.

In step S13, the controller 50 energizes the heater 452 in the catalytic combustion apparatus 45. In the present embodiment, the controller 50 sets output of the heater 452 to an upper limit value in order to start the catalytic combustion apparatus 45.

In step S14, the controller 50 detects the temperature of the catalyst 451 in the catalytic combustion apparatus 45 by the temperature sensor 51. Instead of the temperature sensor 51, a temperature sensor 52 or a temperature sensor 53 may be employed.

In step S15, the controller 50 determines whether or not the temperature of the catalyst 451 is equal to or higher than the combustion threshold Th. In the present embodiment, the combustion threshold Th is set to the lower limit value of the temperature which allows the combustion reaction of the catalyst 451. When the temperature of the catalyst 451 is lower than the combustion threshold Th, the controller 50 waits until the temperature of the catalyst 451 reaches the combustion threshold Th.

In step S16, when the temperature of the catalyst 451 has risen up to the combustion threshold Th, the controller 50 sets the injection amount of the injector 42 to a predetermined value, and injects the raw fuel to the catalytic combustion apparatus 45 from the injector 42 in accordance with the set value.

The above-described predetermined value is the injection amount of the raw fuel when the latent heat of vaporization of the raw fuel injected to the catalytic combustion apparatus 45 is equal to or less than output of the heater 452. In the present embodiment, the controller 50 sets the upper limit value of the injection amount corresponding to the upper limit value of output of the heater 452 as the injection amount of the injector 42, in accordance with the upper limit line 453 shown in FIG. 3.

In step S17, the controller 50 determines whether or not the temperature of the catalyst 451 has risen under electric power being supplied to the heater 452. For example, the controller 50 determines that the temperature of the catalyst 451 has risen when a current value exceeds a previous value. The current value as well as the previous value is with respect to the temperature of the catalyst 451 or with respect to a moving average value thereof. Alternatively, the controller 50 may determine that the temperature of the catalyst 451 has risen when a temperature difference between the temperature of the catalyst 451 at the timing of the injector 42 having started the injection and the current temperature of the catalyst 451 exceeds a predetermined threshold value. When the controller 50 has determined that the temperature of the catalyst 451 has not increased, the controller 50 returns to the process of step S15.

When the controller 50 has determined that the temperature of the catalyst 451 has risen, in step S18, the controller 50 increases the injection amount of the injector 42 in accordance with a combustion energy generated by the combustion of the raw fuel in the catalytic combustion apparatus 45. Specifically, the controller 50 increases the injection amount of the injector 42 so that the latent heat of vaporization of the increment in the injection amount of the raw fuel is equal to or less than the combustion energy of the raw fuel before the increase.

In step S19, the controller 50 determines whether or not the temperature of the catalyst 451 has dropped. For example, with respect to the temperature of the catalyst 451 or the moving average value thereof, when the current value falls below the previous value, the controller 50 determines that the temperature of the catalyst 451 has dropped. Alternatively, when the temperature of the catalyst 451 after increase falls below the temperature of the catalyst 451 before increased, the controller 50 may determine that the temperature of the catalyst 451 has dropped.

When the controller 50 has determined that the temperature of the catalyst 451 has dropped, in step S20, the controller 50 decreases the injection amount of the injector 42 so that the temperature of the catalyst 451 rises. For example, the controller 50 returns the injection amount of the injector 42 to the value set in step S16. Then, the controller 50 returns to the process of step S17.

When the controller 50 has determined that the temperature of the catalyst 451 has not dropped in step S19, the controller 50 executes a warm-up process for raising the temperature of the fuel cell 10 to the temperature allowing the fuel cell 10 to generate electric power. When the warm-up process is completed, the controller 50 terminates the starting-up method.

According to the second embodiment of the present invention, when the temperature of the catalytic combustion apparatus 45 exceeds the predetermined threshold value, the controller 50 executes the process of step S16 for limiting the injection amount of the injector 42 so that the latent heat of vaporization of the raw fuel in the catalytic combustion apparatus 45 becomes equal to or less than output of the heater 452.

As a result, it is possible to prevent the raw fuel from being injected into the catalytic combustion apparatus 45 before the temperature of the catalyst 451 rises up to the temperature which allows the raw fuel gas to be combusted by the catalyst 451. Therefore, it is possible to suppress the raw fuel from staying at the bottom of the catalytic combustion apparatus 45, and to suppress deterioration of the catalyst 451.

According to the present embodiment, when the temperature of the catalytic combustion apparatus 45 rises after starting of the injection of the raw fuel under electric power being supplied to the heater 452, the controller 50 executes the process of step S18 for increasing the injection amount of the injector 42. As a result, it is possible to increase the injection amount of the injector while suppressing the temperature drop in the catalytic combustion apparatus 45.

Further, according to the present embodiment, the controller 50 increases the injection amount of the injector 42 so that the latent heat of vaporization of the increment in the injection amount of the raw fuel is equal to or less than the combustion energy of the raw fuel before the increase. As a result, it is possible to prevent the temperature of the catalytic combustion apparatus 45 from decreasing while increasing the injection amount of the injector 42.

According to the present embodiment, the controller 50 executes the process of step S20 for decreasing the injection amount of the injector 42 when the temperature of the catalyst 451 drops after the injection amount increased. Thus, it is possible to promptly suppress the temperature drop in the catalytic combustion apparatus 45 and also to avoid the deterioration of the catalyst 451.

While embodiments of the present invention have been described above, the above-described embodiments only show a part of the application example of the present invention, and the technical scope of the present invention is not intended to limit to the specific configurations of the above-described embodiments.

For example, although the evaporator 35 is provided in the fuel cell system 100 in the above embodiment, the evaporator 35 may be omitted and replaced by the heater 36.

The above-described embodiments can be combined as appropriate.

The invention claimed is:

1. A catalytic combustion system comprising:
    a catalytic combustion apparatus having a heater capable of heating fuel supplied to a catalyst;
    an actuator supplying oxidant gas to the catalytic combustion apparatus;
    an injector injecting the fuel into the catalytic combustion apparatus; and
    a controller configured to control an injection amount of the fuel to be injected into the catalytic combustion apparatus in response to output of the heater,
    wherein the controller is configured to limit the injection amount when a temperature of the catalytic combustion apparatus exceeds a predetermined threshold, the injection amount limited so that a latent heat of vaporization of the fuel supplied to the catalytic combustion apparatus is equal to or less than the output of the heater.

2. A method for controlling a catalytic combustion apparatus having a heater capable of heating fuel to be supplied to a catalyst, comprising:
    a step of supplying oxidant gas to the catalytic combustion apparatus; and
    an injection step of injecting the fuel into the catalytic combustion apparatus,
    wherein the injection step comprises:
        an electric power feeding step of supplying electric power to the heater, and
        a setting step of setting an injection amount of the fuel to be injected into the catalytic combustion apparatus in response to output of the heater,
        wherein the setting step comprises limiting the injection amount when a temperature of the catalytic combustion apparatus exceeds a predetermined threshold, the injection amount limited so that a latent heat of vaporization of the fuel supplied to the catalytic combustion apparatus is equal to or less than the output of the heater.

3. The method for controlling the catalytic combustion apparatus according to claim 2, wherein:
the injection step comprises injecting liquid fuel as the fuel, the liquid fuel containing water.

4. The method for controlling the catalytic combustion apparatus according to claim 2, wherein:
the setting step comprises increasing the injection amount when the temperature of the catalytic combustion apparatus rises after start of the injection of the fuel under electric power being supplied to the heater.

5. The method for controlling the catalytic combustion apparatus according to claim 4, wherein:
the injection step comprises increasing the injection amount so that the latent heat of vaporization in an increment in the injection amount of the fuel is less than a combustion energy of the fuel.

6. The method for controlling the catalytic combustion apparatus according to claim 4, wherein:
the setting step comprises decreasing the injection amount when the temperature drops under the injection amount having been increased.

* * * * *